United States Patent
Kawachi et al.

(10) Patent No.: US 9,421,702 B2
(45) Date of Patent: Aug. 23, 2016

(54) COMPRESSION MOLDING APPARATUS AND COMPRESSION MOLDING METHOD OF RESIN MOLDED PRODUCT COMPRISING FIBER

(71) Applicant: KABUSHIKI KAISHA MEIKI SEISAKUSHO, Ohbu-shi, Aichi (JP)

(72) Inventors: Takeshi Kawachi, Hadano (JP); Mikio Nagata, Kariya (JP)

(73) Assignee: KABUSHIKI KAISHA MEIKI SEISAKUSHO, Ohbu-Shi (JP)

( * ) Notice: Subject to any disclaimer, the term of this patent is extended or adjusted under 35 U.S.C. 154(b) by 611 days.

(21) Appl. No.: 13/861,031

(22) Filed: Apr. 11, 2013

(65) Prior Publication Data

US 2013/0270730 A1 Oct. 17, 2013

(30) Foreign Application Priority Data

Apr. 13, 2012 (JP) .................................. 2012-92075

(51) Int. Cl.
| | |
|---|---|
| *B29C 43/58* | (2006.01) |
| *B29C 43/52* | (2006.01) |
| *B29C 43/02* | (2006.01) |
| *B29C 45/80* | (2006.01) |
| *B29C 45/14* | (2006.01) |

(52) U.S. Cl.
CPC ............... *B29C 43/58* (2013.01); *B29C 43/02* (2013.01); *B29C 43/52* (2013.01); *B29C 45/14786* (2013.01); *B29C 45/80* (2013.01)

(58) Field of Classification Search
CPC ..................................................... B29C 43/58
USPC ........................................ 265/319, 325, 40.5
See application file for complete search history.

(56) References Cited

U.S. PATENT DOCUMENTS

2003/0230821 A1* 12/2003 Okado .................... B29C 43/58
464/40.5
2009/0117220 A1* 5/2009 Bazzo ..................... B29C 43/58
425/149

FOREIGN PATENT DOCUMENTS

| JP | A-60-222215 | 11/1985 |
| JP | A-10-100173 | 4/1998 |
| JP | A-11-320587 | 11/1999 |
| JP | A-2004-17396 | 1/2004 |
| JP | A-2008-265158 | 11/2008 |

OTHER PUBLICATIONS

Aug. 13, 2012 Japanese Office Action issued in Japanese Patent Application No. 2012-092075 (with translation).

* cited by examiner

*Primary Examiner* — Christina Johnson
*Assistant Examiner* — Xue Liu
(74) *Attorney, Agent, or Firm* — Oliff PLC

(57) ABSTRACT

A material heating mechanism for melting the material into a molten state, an upper plate to which the upper mold is attached and a lower plate to which the lower mold is attached, at least three position sensors for detecting a distance between the upper mold and the lower mold or the upper plate and the lower plate, and at least three compression hydraulic cylinders installed to any one of the upper plate and the lower plate and individually controlled according to information of the position sensors.

4 Claims, 9 Drawing Sheets

Fig. 12

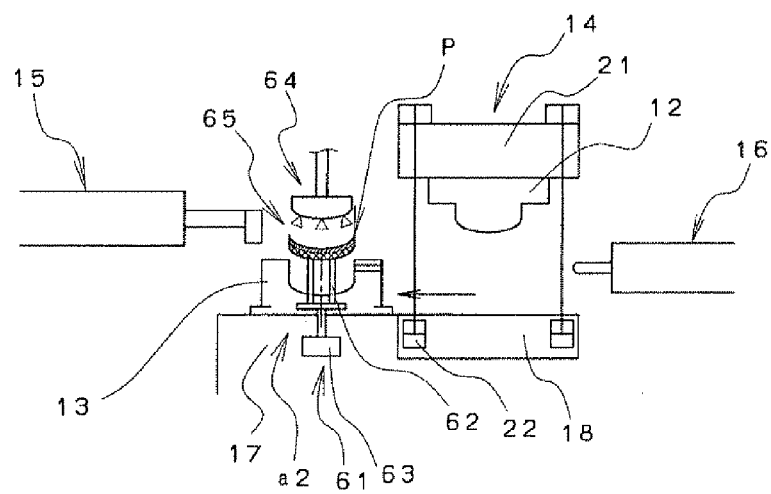

Fig. 13

| | | First manufacturing process | Position control (parallelization control) |
|---|---|---|---|
| Fig. 7 | Compression molding | Second manufacturing process | Position control (parallelization control) + pressure control |
| Fig. 8 | Space molding | | Position control (parallelization control) |
| Fig. 9 | Injection compression molding | First manufacturing process | Position control (parallelization control) |
| Fig. 10 | | Second manufacturing process | Position control (parallelization control) + pressure control |
| Fig. 11 | Removing | | Position control (parallelization control) |

COMPRESSION MOLDING APPARATUS AND COMPRESSION MOLDING METHOD OF RESIN MOLDED PRODUCT COMPRISING FIBER

TECHNICAL FIELD

The present disclosure relates to a compression molding apparatus and a compression molding method of a molded product including a fiber, which supplies a resin material, including a fiber, to an open lower mold by means of a material supply device, then closes the lower mold and the upper mold, and compresses the material.

BACKGROUND ART

As a method for performing compression molding to a molten material, such as a resin in a mold, an injection compression molding method for injecting a molten material into a closed cavity from an injection machine and then compressing the molten material is well known. However, the injection compression molding method has problems since the fiber material may be damaged due to high pressure applied to the molten material during the injection or the fiber material may not be easily charged during injection if the molten material has bad fluidity. In addition, a compression molding method for supplying a molten material to a cavity surface of a lower mold in a state where a mold is open, then closing the upper mold and the lower mold, and compressing the molten material is also known in the art. The compression molding is classified into a compression molding called a transfer molding in which a molten material relatively maintaining its origin form is supplied from a port into a mold, and a compression molding called a stamping mold in which a molten material in a fluid state is supplied from an injection machine or an extrusion machine into a mold.

In case of the stamping molding, since the resin supplied to the lower mold is in a fluid state, it is preferable that a movable mold is moved with high precision and pressurized. Patent Literature 1 is known to conform to the above. Patent Literature 1 discloses that a mold may be moved with high precision by means of position control with respect to a resin material supplied by a material supply device. However, in Patent Literature 1, depending on a shape of the molded product or a supply position of a corresponding resin, the degree of parallelization of a movable mold with respect to the fixed mold may not be maintained. In other words, in the stamping molding, the resin material is not initially pressurized at the center of the mold, and if pressurization is initiated at a location other than the center, the degree of parallelization may not be maintained between the fixed mold and the movable mold. In addition, if the degree of parallelization of the movable mold with respect to the fixed mold is collapsed at an early pressurization stage, it may be difficult to manufacture a final molded product to have a desired plate thickness. Moreover, this problem worsens if a material with bad fluidity such as a large-sized molded product or a resin including carbon fiber is used.

As a solution to the above problem, Patent Literature 2 is known in the art. Patent Literature 2 discloses that the degree of parallelization between a movable mold with respect to a fixed mold is maintained by means of an equilibrating device installed to appear on a bed. In Patent Literature 2, the equilibrating device is installed separately from a pressurizing cylinder with a long stroke. In addition, Patent Literature 2 does not disclose how the position control is performed during the compression molding by using the equilibrating device and how the press pressure control is performed during the stamping molding. Moreover, Patent Literature 2 does not disclose how the position control or the like is performed when the mold is open. Further, Patent Literature 2 discloses a plastic material as the material to be molded, and it is unclear which material is used for molding.

RELATED LITERATURES

Patent Literature

Japanese Unexamined Patent Publication H10-100173 (0026, FIG. 1)

Japanese Unexamined Patent Publication S60-222215 (a left upper section of page 2, a right upper section of page 2, a right upper section of page 3, FIG. 1)

DISCLOSURE

Technical Problem

In Patent Literature 2, a component for maintaining the degree of parallelization of the press molding device is installed on the bed to protrude therefrom, which complicates the structure of the bed. In addition, intermediate support, which is a part of an equilibrating device, is also attached to a bolster to which the lower mold is mounted, thereby complicating the structure of the bolster. Moreover, since the bolster is carried into a press machine and then the support of the equilibrating device is protruded to support the intermediate support, it is not easy to adjust the equilibrating device and the intermediate support. Further, since the intermediate support protrudes around the lower mold, it may contact and disturb a heating barrel of a material supply device which supplies material in a molten state.

Moreover, since Patent Literature 2 does not disclose how the control, such as position control, is performed during pressurization, a person having ordinary skill in the art is unable to perform molding agreeably from initial pressurization until final pressurization even though Patent Literature 2 is read. In addition, as stated in the right upper region of page 2 of Patent Literature 2, the equilibrating device corresponds to a stroke during pressurization, and the use of when the mold is open is not introduced.

Therefore, in one aspect, the present disclosure is directed to a compression molding apparatus and compression molding method, which may mold a preferable molded product including a fiber while simplifying a structure of a press machine when the preferable molded product including a fiber is compression-molded, by supplying a resin material including a fiber to an open lower mold by means of a material supply device, then closing the lower mold and the upper mold, and compressing the material. In another aspect, the present disclosure is directed to providing a compression molding apparatus and compression molding method, which may mold a preferable molded product, including a fiber, by establishing a control method during pressurization. Furthermore, the present disclosure is directed to provide a compression molding apparatus and compression molding method, which may mold a preferable molded product, including fiber, by establishing a control method when the mold is open.

Technical Solution

In one general aspect, a compression molding apparatus of a resin molded product, including a fiber, defined in claim 1, supplies a resin material including a fiber to an open lower mold by means of a material supply device, then closes the lower mold and an upper mold, and compresses the material, the compression molding apparatus including: a material heating mechanism for melting the resin material including a fiber into a molten state until compression molding is initiated; an upper plate to which the upper mold is attached and a lower plate to which the lower mold is attached; at least three position sensors for detecting a distance between the upper mold and the lower mold or the upper plate and the lower plate; and at least three compression hydraulic cylinders installed to any one of the upper plate and the lower plate and individually controlled according to information of the position sensors, wherein compression molding is performed by pressurizing the material by means of the compression hydraulic cylinders.

In the compression molding apparatus of a resin molded product, including a fiber according to claim 1, defined in claim 2, pressure sensors for detecting a pressure of a working fluid may be installed at compression hydraulic cylinders, and the compression hydraulic cylinders may be individually controlled according to information of the pressure sensors.

In another general aspect, a compression molding method of a resin molded product, including a fiber, defined in claim 3, supplies a resin material including a fiber to an open lower mold by means of a material supply device, then closes the lower mold and an upper mold, and compresses the material, wherein they are installed: a material heating mechanism for melting the resin material including a fiber into a molten state until compression molding is initiated; an upper plate to which the upper mold is attached and a lower plate to which the lower mold is attached; at least three position sensors for detecting a distance between the upper mold and the lower mold or the upper plate and the lower plate; and at least three compression hydraulic cylinders installed to any one of the upper plate and the lower plate and individually controlled according to information of the position sensors, wherein compression molding is performed by pressurizing the material by means of the compression hydraulic cylinders.

In the compression molding method of a resin molded product, including fiber according to claim 3, defined in claim 4, pressure sensors for detecting a pressure of a working fluid may be installed at the compression hydraulic cylinders, and the compression molding of the material may be performed by individually controlling the compression hydraulic cylinder according to information of the at least three pressure sensors to perform position control, and then individually controlling the compression hydraulic cylinders according to only the information of the plurality of pressure sensors or according to information of the at least three position sensors along with information of the pressure sensors.

Advantageous Effects

The compression molding apparatus and compression molding method of a resin molded product including a fiber according to the present invention, which supplies a resin material including a fiber to an open lower mold by means of a material supply device, then closes the lower mold and an upper mold, and compressing the material, includes a material heating mechanism for melting the resin material including a fiber into a molten state until compression molding is initiated; an upper plate to which the upper mold is attached and a lower plate to which the lower mold is attached; at least three position sensors for detecting a distance between the upper mold or the upper plate and the lower mold or the lower plate; and at least three compression hydraulic cylinders installed to any one of the upper plate and the lower plate and individually controlled according to information of the position sensors, wherein compression molding is performed by pressurizing the material by means of the compression hydraulic cylinders. Therefore, it is possible to mold a preferable resin molded product including a fiber while designing the press machine with a simple structure, in comparison to an existing apparatus.

DESCRIPTION OF DRAWINGS

FIG. 12 is a diagram showing the compression molding method of a resin molded product including a fiber according to the embodiment, which illustrates a state in which the lower mold is carried from the press machine and the composite molded product is being taken out.

FIG. 13 is a table showing the compression molding method of a resin molded product including a fiber according to the embodiment, which illustrates the control method of FIGS. 7 to 11.

DETAILED DESCRIPTION OF MAIN ELEMENTS

Figure 1:
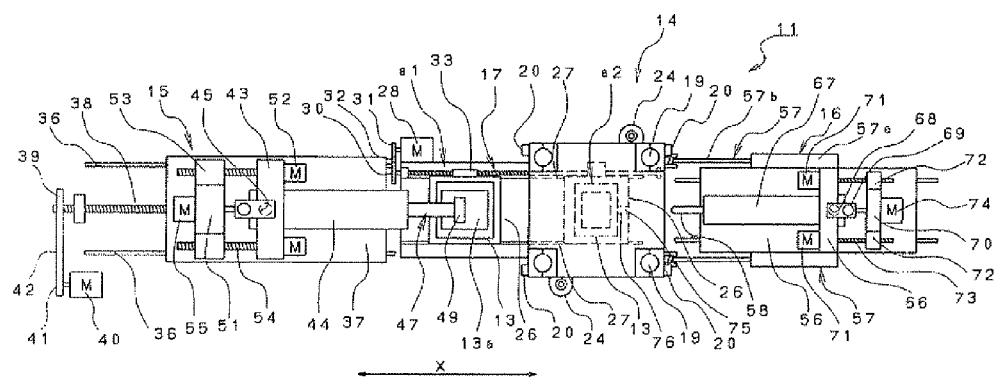
FIG. 1 is a plane view showing a compression molding apparatus of a resin molded product including a fiber according to an embodiment.

11: compression molding apparatus
12: upper mold
12a, 13a: cavity surface
13: lower mold
14: press machine
15: material supply device (material heating mechanism)
18: fixed plate
20: position sensor
21: movable plate
22: compression hydraulic cylinder
34: control device
86: servo valve
87, 88: pressure sensor
M: resin material including a fiber (resin material including a carbon fiber)
M1: primary molded product
M2: molten resin
P: composite molded product including a fiber (composite molded product including a carbon fiber)

BEST MODE

A compression apparatus 11 of a resin molded product including a fiber, according to this embodiment, will be described with reference to FIGS. 1 to 3. The compression apparatus 11 of a resin molded product including a fiber according to this embodiment includes a vertical press machine 14 for compressing a resin material M including a fiber between an upper mold 12 and a lower mold 13, a material supply device 15 for supplying the resin material M including a fiber and serving as a material heating mechanism for making the resin material M including a fiber into a molten state, and a horizontal injection machine 16 for injecting the molten material. In addition, a moving device 17 of the lower mold 13 is installed between the press machine 14 and a supply position a1 of the resin material M including a fiber, directed to the lower mold 13 by the material supply device 15.

Figure 2:
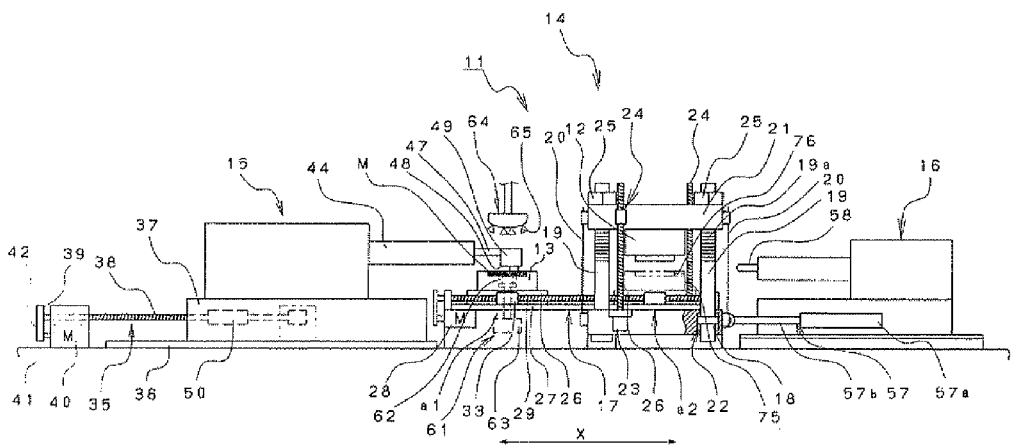
FIG. 2 is a front view showing the compression molding apparatus of a resin molded product including a fiber according to the embodiment.
Figure 3:
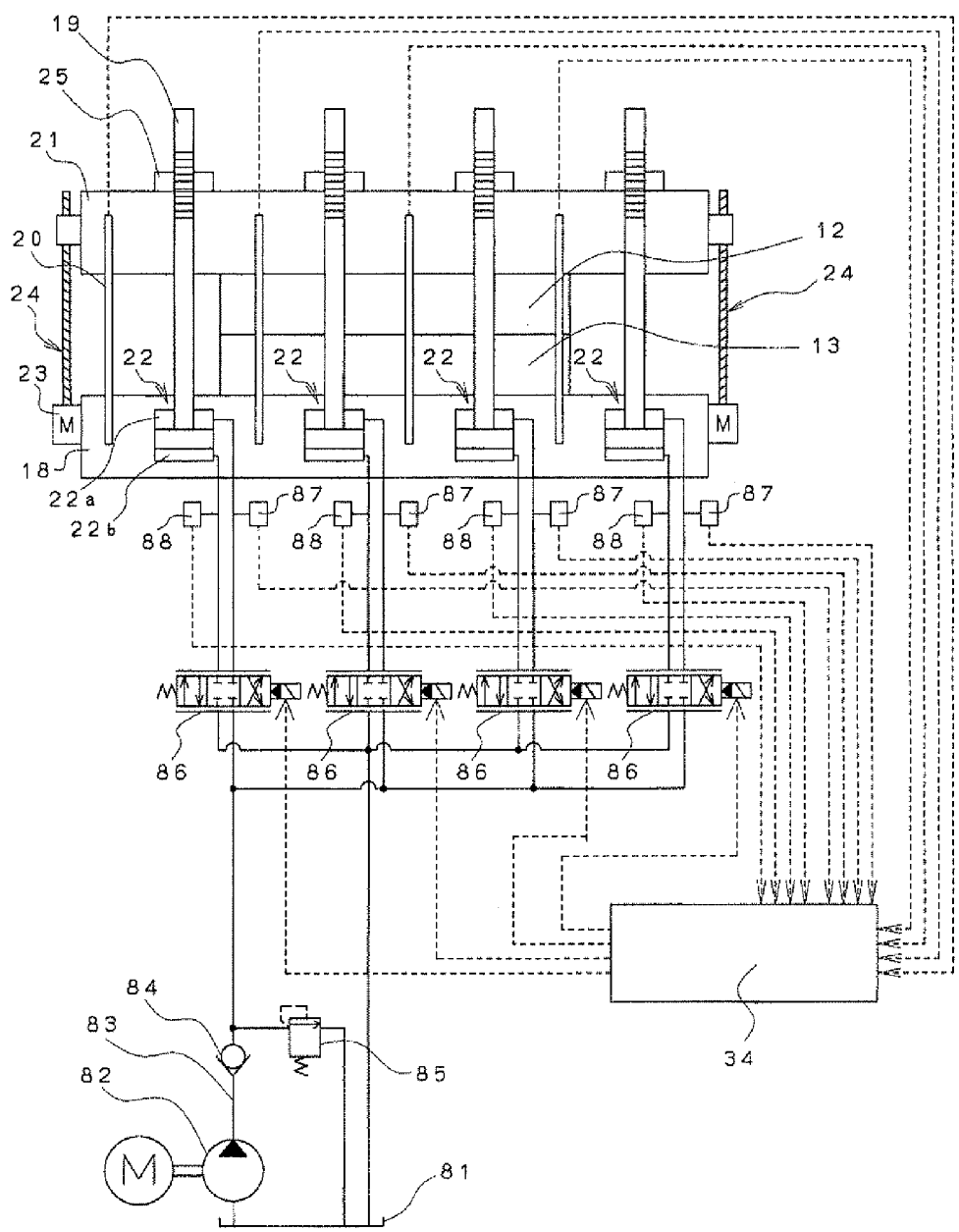
FIG. 3 is a control block diagram showing the compression molding apparatus of a resin molded product including a fiber according to the embodiment.

Regarding the press machine 14, as shown in FIG. 2, compression hydraulic cylinders 22 are installed near four corners of a fixed plate 18 serving as a lower plate and to which the lower mold 13 is attached. In addition, a rod of the compression hydraulic cylinder 22 forms a tie bar 19, and the tie bar 19 stands upwards. Moreover, a hooking-fitting portion 19a having a hooking-fitting groove is formed at the tie bar 19. In addition, the upper side portion of the tie bar 19 is inserted into the holes near four corners of a movable plate 21 serving as an upper plate and to which the upper mold is attached. Moreover, a plurality of electrically-powered opening and closing mechanisms 24 having a ball thread, a ball thread nut, a plurality of mold opening and closing servo motors 23 or the like are installed between the fixed plate 18 and the movable plate 21. In addition, the movable plate 21 lifts up along the tie bar 19 according to the operation of the electrically-powered opening and closing mechanism 24. Moreover, a half nut 25 is attached to the movable plate 21 and may be hooking-fit into the hooking-fitting portion 19a formed at the tie bar 19. However, the compression hydraulic cylinder 22 may be installed at the movable plate 21 serving as an upper plate or may be a plate at which the half nut 25 is installed, without being limited thereto. In this embodiment, four compression hydraulic cylinders 22 are installed at the fixed plate 18, but the number of compression hydraulic cylinders 22 may be at least three. In addition, the press machine for parallelization control of the present invention may be configured as follows. The press machine may include a pressure receiving plate installed at the upper portion of the upper plate, in addition to the lower plate to which the lower mold is attached and the upper plate to which the upper mold is attached. In this case, the tie bar is inserted through a space between the pressure receiving plate and the lower plate, and the upper plate serving as a movable plate lifts up or lifts down along the tie bar by means of the mold opening and closing mechanism. In the press machine having the pressure receiving plate, a pressurizing cylinder is attached to the center portion of the pressure receiving plate, and a ram of the pressuring hydraulic cylinder is fixed to the rear surface of the upper plate. In addition, separately from the pressurizing cylinder, cylinder units of at least three, preferably four compression hydraulic cylinders are attached to any one of the upper plate and lower plates, and rods of the compression hydraulic cylinders are attached to the other of the upper plate and lower plates. Moreover, if the press machine does not perform parallelization control, a vertical mold coupling device to which a general toggle-type mold coupling mechanism is installed or a general vertical mold coupling device to which a mold coupling cylinder and a mold opening and closing mechanism are installed may be used.

In addition, between the fixed plate 18 and the movable plate 21, a position sensor 20 for measuring a distance between the fixed plate 18 and the movable plate 21 is installed. The number of the position sensors 20 may be selected corresponding to the number of the compression hydraulic cylinders 22, and in this embodiment, four position sensors are installed. However, the number of the position sensors may be more than 3. In addition, each position sensor 20 connects to a control device 34, and position information detected by the position sensor 20 is sent to the control device 34. In the press machine 14, the position sensor 20 may be preferably installed near the tie bar 19. In addition, the position sensor 20 may detect a distance between the upper mold 12 and the lower mold 13 or a distance between the upper mold 12 and the lower plate or a distance between the lower mold 13 and the upper plate. The kind of the position sensor 20 is not limited, and a detection device and its scale installed to any plate are not specially limited. Between the fixed plate 18 and the movable plate 21, the position sensors 20 are installed at four places.

Next, a hydraulic circuit and control of the compression hydraulic cylinder 22 will be described. As shown in FIG. 3, with respect to four compression hydraulic cylinders 22 installed in the fixed plate 18, pumps 82 for supplying a working fluid from a tank 81 are installed, and a check valve 84 or the like is installed at a main duct 83 connected to the pump 82. In addition, a relief valve 85 is installed at a duct branched from the main duct 83 to control the upper limit of pressure of the working fluid of the main duct 83. The relief valve 85 may be designed to be able to control pressure, or a separate pressure controlling valve may be designed to be able to control pressures of working fluids supplied to the compression hydraulic cylinders 22 in a bundle or individually. A servo valve 86 is respectively installed at a branching duct branched from the main duct 83 to each compression hydraulic cylinder 22, and the branching duct connects to a P port of the servo valve 86. In addition, the A port and B port of the servo valve 86 respectively connect to a compressing oil chamber 22a of the compression hydraulic cylinder 22 and a mold-opening oil chamber 22b of the compression hydraulic cylinder 22 by using respective ducts. Further, the T port of the servo valve 86 connects to the tank 81. A pressure sensor 87 is installed at a duct connected to the compressing oil chamber 22a of the compression hydraulic cylinder 22, and an oil pressure sensor 88 is installed at a duct connected to the mold-opening oil chamber 22b.

The pressure sensors 87, 88 respectively connect to the control device 34, and pressure information detected by the pressure sensors 87, 88 is sent to the control device 34. In addition, the control device 34 sends an instruction to each servo valve 86. Therefore, the compression hydraulic cylinders 22 are individually controlled by the servo valves 86, respectively. In this embodiment, the control device 34 includes a control device with a broad concept including a servo amplifier and also has a timer function. In addition, in case a pressure control valve or the like is installed, the control device 34 also controls the same.

The lower mold 13 of the press machine 14 is attached to a lower mold attachment plate 26 and is movable in the X-axis direction in FIG. 1 between a pressurization position a2 in the press machine 14 and a supply position a1 out of the press machine 14. In addition, a moving device 17 of the lower mold 13 is connected and fixed to one side (the left side in FIG. 4) of the fixed plate 18. The upper surface of the moving device 17 of the lower mold 13 is formed with the same height as the upper surface of the fixed plate 18, and two guide rails 27 for moving the lower mold 13 are installed over both sides of said upper surfaces. Moreover, the lower mold attachment plate 26 moves along the guide rail 27. Though not shown in the figures, an electrically-driven rolling ball, or an axle and a wheel, is installed at the lower surface of the lower mold attachment plate 26 via a spring, and if the lower mold attachment plate 26 and the lower mold 13 moves between the pressurization position a2 in the press machine 14 and the supply position a1 out of the press machine 14, the lower surface of the lower mold attachment plate 26 is separated from the upper surface of the fixed plate 18 or the upper surface of the moving device 17. In addition, if the upper mold 12 and the lower mold 13 are closed and compression-molded (including injection compression molding) at the pressurization position a2 of the fixed plate 18, the spring is shrunken and the lower mold attachment plate 26 is clamped to the fixed plated 18 by means of a clamp (not shown), so that the upper surface of the fixed plate 18 and the lower surface of the lower mold attachment plate 26 are closely adhered to each other.

A driving source of the moving device 17 of the lower mold 13 is a servo motor 28, and the servo motor 28 is fixed to a side of the moving device 17 at the supply position a1. In addition, a ball thread 29 is installed in parallel to the guide rail 27, and one part of the ball threads 29 is rotatably fixed to the upper surface of the moving device 17 by means of a bearing, and the other part is rotatably fixed to the upper surface of the fixed plate 18 by means of a bearing. In addition, a driven pulley 30 is fixed near an end of the ball thread 29 nearer to one side than the bearing, and a timing belt 32 for transmitting a driving force between the pulley 30 and a driving pulley 31 of the servo motor 28 lies thereon. In addition, a ball thread nut 33 is fixed to a side of the lower mold attachment plate 26, and the ball thread 29 is inserted through the ball thread nut 33. Moreover, if the servo motor 28 operates, the ball thread 29 rotates, so that the ball thread nut 33, the lower mold attachment plate 26 and the lower mold 13 linearly move in the X-axis direction. In addition, the ball thread nut 33 of the moving device 17 of the lower mold 13 may be attached to the rear surface of the lower mold attachment plate 26, without being limited thereto. Moreover, the lower mold 13 may also be pulled out of the press machine 14 by means of a rotary table, and in this case a moving trajectory of the lower mold by the moving device becomes an arc.

Regarding the molds 12, 13 attached to the press machine 14 and used in this state, it is preferable that the lower mold 13 has a concave shape (a cavity form) so that a supplied resin material M (a fiber and a resin material) including a fiber in a molten state does not run down, and the upper mold 12 has a convex shape (a core form). In addition, since the lower mold 13 moves after the resin material M including a fiber is supplied, a heating mechanism may be provided so that the resin material M including a fiber in a molten state does not solidify in the meantime. The heating mechanism may use a heater or a device capable of converting a medium supplied in the mold into a heating medium and a cooling medium. In addition, a heat source such as IR irradiation or a heater may be installed to the upper portion of the moving device 17 of the lower mold 13 so that the supplied resin material M including a fiber does not solidify. Moreover, in the case a heating mechanism is installed at the lower mold 13, a heating mechanism may also be installed at the upper mold 12 since the molded product may be bent.

A hot runner 76 is installed at the lower mold 13 to communicate between a cavity surface 13a and a nozzle touch surface 75. A gate valve, not shown, is installed at the hot runner 76, and the gate valve is closed during compression molding.

An ejector plate of an ejector device 61 and a plurality of protruding pins 62 standing at the ejector plate are mounted in the lower mold 13. In addition, a driving source 63 and an ejector rod of the ejector device 61 is installed to the moving device 17 at a lower location of the material supply position a1. Moreover, regarding the composite molded product P, if the lower mold 13 reaches the material supply position a1, the ejector device 61 operates so that the composite molded product P protrudes from the lower mold 13. However, the ejector device 61 may be installed at the fixed plate 18 or the movable plate 21 of the press machine 14. Moreover, the cavity of the mold may be vacuous. In detail, the cavity formed when the upper mold and the lower mold are fit with each other is sealed by a seal member and isolated from the outside. In this case, the cavity may come into a vacuous state by using a vacuum pump through a duct from a part of the cavity or the seal area including cavity. In other case, the cavity may come into a vacuous state by installing a vacuum chamber to cover the entire mold or the entire press machine 14.

In addition, an unloading unit 64 is movably mounted to the moving device 17 at an upper location of the material supply position a1. The unloading unit 64 is movable horizontally and vertically by means of servo motors, not shown, and may connect to a negative pressure sucking means to suck the composite molded product P by using a sucking disk 65 which performs negative pressure sucking. Therefore, in this embodiment, the material supply position a1 is also an unloading location of the composite molded product P, so that the space above the material supply position a1 is invaded by the unloading unit 64 and the material supply device 15 in turns (in FIG. 1, the unloading unit 64 is not depicted, and in FIG. 2, the unloading unit 64 is in a standby state above the material supply device 15). As described above, since a single lower mold 13 is used out of the press machine 14 to supply the resin material M including a fiber for stamping molding or takes out the composite molded product P, the press machine 14 may have a small mold opening gap, which allows the press machine 14 to have a small height.

Next, the material supply device 15 serving as a material heating mechanism will be described with reference to FIGS. 1 and 2. The material supply device 15 is movable by means of a forward and backward moving device 35 in the X-axis direction which is identical to the moving direction of the moving device 17 of the lower mold 13.

As shown in FIG. 2, the moving device 35 of the material supply device 15 includes two guide rails 36 installed on a base or ground, and a support 37 of the material supply device 15 is movable on the guide rails 36. In addition, a ball thread 38 is rotatably disposed on the base or ground, and a ball thread nut 50 fixed to the support 37 is inserted through the ball thread 38. In addition, a driven pulley 39 is fixed near an end of the ball thread 38, and a timing belt 42 lies over a gap between the driven pulley 39 and the driving pulley 41 of the servo motor 40. Therefore, by means of the operation of the servo motor 40, the support 37 of the material supply device 15 and the ball thread nut 50 of the material supply device 15 linearly move. However, the moving device 35 may be attached to sides of the support 37 and the moving device 17, without being limited thereto.

A device having a plasticizing function and an injecting function, substantially identical to an injection device of an injection molding machine, is mounted on the support 37 of the material supply device 15. A heating barrel 44 to which a heater (a material heating mechanism) is attached is inserted through a front plate 43 fixedly standing on the support 37. In addition, a molding material supply hole 45 is vertically formed in the front plate 43, and the lower portion of the supply hole 45 communicates with the inside of the heating barrel through the hole of the heating barrel 44. Moreover, a molding material feeding device 46 having a feed screw connects to the upper portion of the supply hole 45. A nozzle 47 to which a heater is attached is mounted at the front end of the heating barrel 44. A die 49 having a supply hole 48 oriented downward is attached to the front end of the nozzle 47. The supply hole 48 of the die 49 has predetermined width and length. In this embodiment, a die 49 having a supply hole 48 with a slightly smaller length than the length of a rectangular cavity surface 13a of the lower mold 13 in a direction orthogonal to the X-axis direction, is attached. Therefore, resin sheets including a fiber, which have a slightly shorter length than the length of the cavity surface 13a in a direction orthogonal to the X-axis direction may be successively supplied. However, a part of the die 49 attached to the front end of the nozzle 47 may be exchanged with an optimal one according to the shape or size of the cavity surface 13a of the lower mold 13. In addition, the die 49 may be exchanged with a different die 49 depending on a molding material, in consideration of fluidity of the resin material M including a fiber and a fiber cutting problem of the resin material M including a fiber. At the die 49 mounted at the front end of the nozzle 47 or the nozzle 47 mounted just in the front thereof, a valve (not shown) for opening or closing a channel is frequently installed.

A rear plate 51 is installed at the rear of the front plate 43 in parallel to the front plate with a predetermined gap. Servo motors 52 for injection are respectively installed along the heating barrel 44 at the front surface of the front plate 43, and ball thread nuts 53 are also respectively installed at both sides of the rear plate 51. In addition, a ball thread 54 directly coupled to the drive shaft of the servo motor 52 is inserted through the ball thread nut 53. Moreover, a screw (not shown) having a check valve attached thereto is disposed in the heating barrel 44 for injection molding, and the rear end of the shaft of the screw is fixed to the drive shaft of a metering servo motor 55, which is fixed to the rear surface of the rear plate 51 by means of a sleeve or coupling.

Therefore, the screw in the heating barrel rotates by the operation of the metering servo motor 55 and moves forward or backward by the operation of the injection servo motor 52. However, the structure of the material supply device 15 is not limited to the above but may have three plates or a single injection servo motor. Moreover, the injection or metering driving source may use an oil pressure. Further, a material supply device for extruding a resin material M including a fiber by a plunger or an extruding material supply device for extruding a molten material by rotating just a screw in the heating barrel may be used as the material supply device.

In addition, in this embodiment, the horizontal injection machine 16 is disposed at the other side (the right side in FIG. 1) of the vertical press machine 14. Therefore, with the press machine 14 being interposed therebetween, the material supply device 15 of the molten material is installed at one side, and the horizontal injection machine 16 having a nozzle 58 oriented toward the press machine 14 is installed at the other side. The structure of the injection machine 16 is similar to that of the material supply device 15 serving as a material supply device and not described in detail here. The forward and backward moving device of the injection machine 16 includes a cylinder case 57a of a shift hydraulic cylinder 57 fixed to a support 56 and a rod 57b of the shift hydraulic cylinder 57 fixed to a side of the fixed plate 18. In addition, the shift hydraulic cylinder 57 generates a force to a nozzle touch surface when the nozzle 58 of the injection machine 16 meets the nozzle touch surface 75 of the lower mold 13.

Moreover, a heating barrel 67 having a heater attached thereto is inserted through a front plate 66 fixed to stand on the support 56. In addition, a molding material supply hole 68 is vertically formed in the front plate 66, and the lower portion of the supply hole 68 communicates with the inside of the heating barrel through the hole of the heating barrel 67. Moreover, a molding material feeding device 69 having a feed screw connects to the upper portion of the supply hole 68. The nozzle 58 having a heater attached thereto is mounted at the front end of the heating barrel 44.

A rear plate 70 is installed at the rear of the front plate 66 in parallel to the front plate 66 with a predetermined gap. Injection servo motors 71 are respectively installed along the heating barrel 67 at the front of the front plate 66, and ball thread nuts 72 are also respectively installed at both sides of the rear plate 70. In addition, a ball thread 73 directly coupled to the drive shaft of the injection servo motor 71 is inserted through the ball thread nut 72. Moreover, a general screw (not shown) having a check valve attached thereto is disposed in the heating barrel 67 for injection molding, and the rear end of the shaft of the screw is fixed to the drive shaft of a metering servo motor 74 fixed to the rear surface of the rear plate 70 by means of a sleeve or coupling.

Therefore, the screw of the heating barrel 67 rotates by the operation of the metering servo motor 74, and moves forward or backward by the operation of the injection servo motor 71. However, though the structure or arrangement of the injection machine 16 are not specially limited, for example, the injection machine 16 may be vertically installed and the nozzle may encounter the mold through a hole formed at the center of the fixed plate or the movable plate. However, considering the easiness in maintenance of the injection machine 16 and the relation with a ceiling height of a factory, the injection machine 16 may be a horizontal injection machine.

In addition, the nozzle 58 of the injection machine 16 may be exchanged, and the die 49 like the material supply device 15 may be attached to supply a secondary molding material for stamping molding. Moreover, the lower mold 13 of the compression molding apparatus 11 may be fixedly installed, and the compression molding apparatus 11 may use a single injection molding machine (including an injection compression molding machine), or various other methods.

Next, a compression molding method of a resin-molded product including a fiber by using the compression apparatus 11 of a resin molded product including a fiber according to this embodiment will be described with reference to FIGS. 4 to 13. As a material used in this embodiment, an example (CFRTP) of using a thermoplastic resin (for example, polycarbonate) as the resin material M including a carbon fiber will be described. A binder resin of the resin material including a fiber may be a thermoplastic resin, which is at least one kind of resin selected from polycarbonate, polypropylene, polyethylene, polyethylene terephthalate, polyamide, ABS or the like. In addition, in case of a thermosetting resin, the binder resin may be at least one resin selected from epoxy, polyurethane, phenol or the like, or a mixed resin of a thermoplastic resin and a thermosetting resin. In addition, the fiber may contain a fiber such as a glass fiber, a plant fiber, a chemical fiber or the like other than a carbon fiber. Moreover, the compression apparatus 11 of a resin molded product including a fiber according to this embodiment is useful for molding a mixture of a resin and a material with bad fluidity, for example a mixture of a resin and carbon.

As a sequence of the molding, first, in a state in which the press machine 14 is in a mold-opened state, the servo motor 28 is operated so that the lower mold attachment plate 26 and the lower mold 13 moves to the supply position a1 out of the press machine 14, and then is positioned and stopped there (the process of taking out the composite molded product P will be described later). Until moving to the supply position a1 of the lower mold 13, the material supply device 15 rotates the metering servo motor 40 and applies a back pressure to the injection servo motor 52, so that a polycarbonate resin including a carbon fiber, which serves as the resin material M including a fiber in front of the screw in the heating barrel 44, is weighed (stored), and stands by at the supply position a1. During the taking-out process, the unloading unit 64 takes out the composite molded product P at the material supply position a1, the material supply device 15 is located at the rear and, after the taking-out process, advances along the X-axis direction and reaches a supply position. The stop position of the material supply device 15 is determined according to a location relation between the press machine 14, but as nearest to the press machine 14 as possible in order to shorten a moving distance of the lower mold 13.

As described above, the cavity surface 13a of the lower mold 13 is in a heated state at this time. In addition, the resin material M (a carbon fiber and a resin material) including a carbon fiber in a molten state is supplied onto the cavity surface 13a of the lower mold 13 from the material supply device 15. The resin material M including a carbon fiber is supplied by opening a valve, not shown, of the nozzle 47 of the material supply device 15, operating the injection servo motor 52 to move the screw forwards, and then making the resin material M including a carbon fiber fall from the supply hole 48 of the die 49. The length of the supply hole 48 of the die 49 of this embodiment (the length in a direction orthogonal to the X axis) is shorter than the length of the approximately rectangular cavity surface 13a in a direction orthogonal to the X axis. Therefore, the resin material M including a carbon fiber is supplied in a sheet shape to cover the cavity surface 13a.

Figure 4:
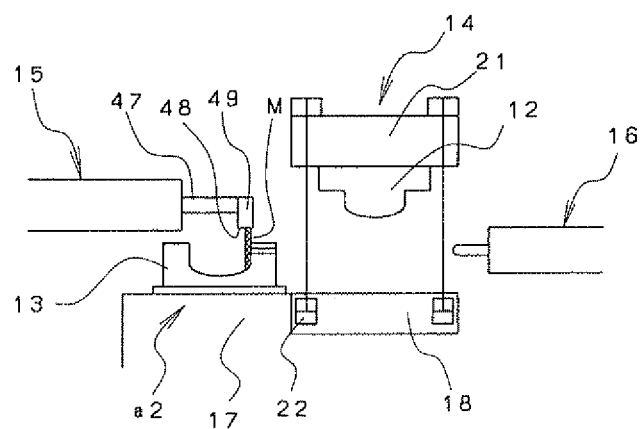
FIG. 4 is a diagram showing a compression molding method of a resin molded product including a fiber according to the embodiment, which illustrates a state just after initially supplying a molten material by means of a material supply device.

As shown in FIG. 4, the resin material M, including a carbon fiber in a molten state according to this embodiment, is supplied from the material supply device 15 to the lower mold 13 so that the resin material M including a carbon fiber initially falls to a location near the front end of the cavity surface 13a of the lower mold 13 (near the press machine 14). In addition, in a state in which the material supply device 15 is stopped at a present location, the servo motor 28 of the moving device 17 is operated to move the lower mold 13 toward the press machine 14, so that the resin material M including a carbon fiber is supplied to cover most of the cavity surface 13a of the lower mold 13. However, the resin material M including a carbon fiber may be supplied when the lower mold 13 and the material supply device 15 are fixed or when the material supply device 15 is moving. Further, both the lower mold 13 and the material supply device 15 may move together, for example the lower mold 13 advances forward toward the press machine 14 and the material supply device 15 retreats. In addition, the lower mold 13 and the material supply device 15 may move in different directions, for example in a direction orthogonal to the X axis.

Figure 5:
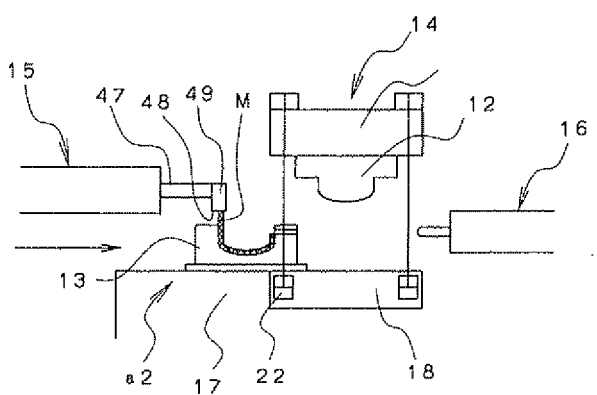
FIG. 5 is a diagram showing the compression molding method of a resin molded product including a fiber according to the embodiment, which illustrates a state just before finishing the supply of the molten material by means of the material supply device.

Next, as shown in FIG. 5, if the lower mold 13 moves forwards so that the supply hole 48 of the die 49 of the material supply device 15 is located at the upper portion near the rear end of the cavity surface 13a (a farther side based on the press machine 14), the supply of material from the material supply device 15 is stopped. In view of the material supply device 15, when the lower mold 13 reaches the location of FIG. 4, the screw in the heating barrel 44 moves forward to a predetermined location, thereby controlling the nozzle 47 to close the valve.

Figure 6:
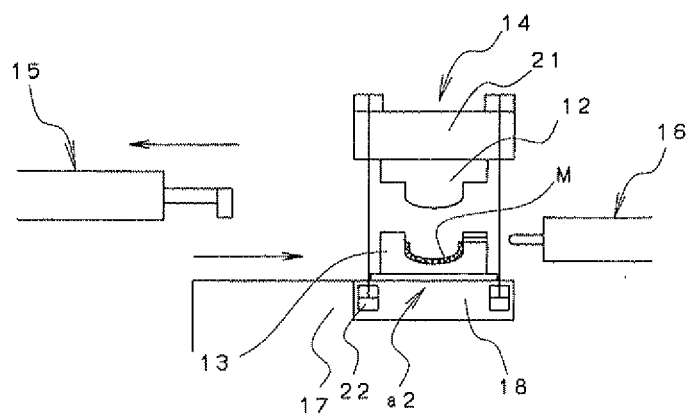
FIG. 6 is a diagram showing the compression molding method of a resin molded product including a fiber according to the embodiment, which illustrates a state in which a lower mold is moved to a pressurization position of a press machine.
Figure 7:
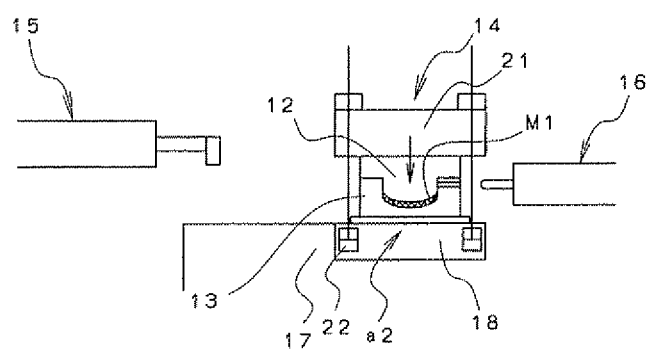
FIG. 7 is a diagram showing the compression molding method of a resin molded product including a fiber according to the embodiment, which illustrates a state in which compression molding (or, stamping molding) is performed to the molten material between the lower mold and the upper mold.

Next, as shown in FIG. 6, if the resin material M including a carbon fiber is completely supplied, the lower mold 13 successively moves to the pressurization position a2 of the press machine 14 by means of the moving device 17. At the pressurization position a2 of the press machine 14, the lower mold attachment plate 26 is positioned and stopped, and is fixed to the press machine 14 by means of a positioning pin or clamp, not shown. By adopting such a material supplying method, after the resin material M including a carbon fiber is supplied to the lower mold 13, the time taken for the lower mold 13 to reach the pressurization position a2 of the press machine 14 may be shortened. In addition, in case of taking out the composite molded product P including a carbon fiber, which has been completely molded, at the supply position a1, the material supply device 15 retreats in preparation for an entry of the unloading unit 64. In addition, it is also possible that only the carbon fiber is in advance supplied onto the lower mold 13 and then a resin material in a molten state is supplied from the material supply device 15 to make a resin material M including a carbon fiber.

Next, as shown in FIGS. 2, 3, 7 and 13, the servo motor 23 serving as a mold opening and closing mechanism of the press machine 14 is operated to move the upper mold 12 downwards, and the convex portion of the upper mold 12 is fit into the concave portion of the lower mold 13, or just before that, the half nut 25 is operated so that the half nut 25 is hooking-fit with the hooking-fitting portion 19a of the tie bar 19. At this time, it is preferable that the resin material M in a molten state has not yet been pressurized. In this state, the cavity may be formed vacuous. By making the cavity vacuous, when the resin material M including a fiber in a molten state is pressurized, bubbles or the like are removed, thereby improving the adhesion between the fiber material and the resin material. In other case, in a state of being not pressurized, the resin material M in any one of a molten state, a half-molten state and a non-molten state may be heated for a predetermined time. Next, the compression hydraulic cylinder 22 is operated to initiate compression molding. The compression hydraulic cylinder 22 is operated by transferring the working fluid from the pump 82 to each compressing oil chamber 22a through the servo valve 86. In the compression molding, a first pressurizing process is performed by means of position control, and the position sensor 25 detects a location and then feedback control is performed. At this time, the control to an instructed location is performed according to the time measured by the control device 34. However, speed control may be performed in the first pressurizing process.

In addition, at this time, position control is performed so that a value of the position sensor 20 (a value from an origin) becomes the same value, and parallelization control is performed so that the degree of parallelization of the movable plate 21 with respect to the fixed plate 18 is maintained. In other case, the parallelization control is performed so that the upper mold 12 serving as a movable mold becomes parallel to the lower mold 13 serving as a fixed mold. Further, the parallelization control may be performed to be parallel to a control origin set from an actual measurement value of the plate thickness of the composite molded product P including a fiber. The position sensor 20 may perform the parallelization control in various ways. For example, the servo valve 86 may be controlled so that a one-axis compression hydraulic cylinder 22 may be used as a master cylinder to perform position control by means of the servo valve 86, and the other compression hydraulic cylinder may be used as a slave cylinder to follow the master cylinder. In other case, the servo valve 86 may be controlled by using a position control method in which an average location value of the compression hydraulic cylinders 22 is set to be a target location and each compression hydraulic cylinder 22 is controlled to reach the target. In the latter case, a difference between each position sensor 20 and the target location is obtained to generate a control signal, and feedback control is performed to control the servo valve 86 of each compression hydraulic cylinder 22. In addition, in both the former case and the latter case, a feed-forward element or the like may be added to each compression hydraulic cylinder 22 to ensure a better advancing speed.

Here, while the first pressurizing process of the compression molding is performed, the cavity surface 12a of the upper mold 12 moves down while pressing down and collapsing the resin material M including a fiber in a molten state. At this time, the degree of parallelization of the upper mold 12 with respect to the lower mold 13 may be maintained, and the pressurizing process may be performed at an agreeable speed. As shown in FIG. 13, if one of the position sensors 20 detect that the movable plate 21 advances till the set location or an average value of the position sensors 20 reaches the set location, and/or if one of the pressure sensors 87 that detect the working fluid of the compressing oil chambers 22a of the compression hydraulic cylinder 22 detect a set pressure or an average value of detected values of the pressure sensors 87 reaches the set pressure, the compression hydraulic cylinder 22 may be switched from only the position control (or the speed control) into a second pressurizing process in which position control (or speed control) and pressure control are used together. In this case, a factor of the position control (or the speed control) may use a method of matching a location of another compression hydraulic cylinder 22 (detected by the position sensor 20) with the compression hydraulic cylinder 22 of the master axis or a method of controlling a location of each compression hydraulic cylinder 22 (detected by the position sensor 20) to reach the target location which is calculated from the average value of detected values of the sensors of each axis.

In addition, regarding the pressure control, pressures of the working fluids of the compressing oil chambers 22a of the compression hydraulic cylinder 22 are detected by the pressure sensor 87, and their average value is calculated and used for feedback control. Moreover, a difference between the pressure and a target pressure is obtained to generate a control signal of the pressure loop. During this pressure control, it is preferable that the pressure of the working fluid of the mold-opening oil chamber 22b may also be detected by the pressure sensor 88 and used for control. In addition, the control signal by a pressure loop is added to the control signal by the position loop and used for the second pressurizing process of the compression molding. Moreover, regarding the pressure control, the servo valve 86 may be individually controlled for each compression hydraulic cylinder 22 so that the value of each pressure sensor 87 becomes a target pressure. In this case, the factor of the speed control (or the position control) is added to a factor of the control signal for the pressure control of the individual compression hydraulic cylinder 22 and used for compression molding.

Therefore, in the second pressurizing process of the compression molding according to this embodiment, the pressure control may be performed while maintaining the degree of parallelization of the movable plate 21 with respect to the fixed plate 18 by means of the position control (or the speed control), and therefore the degree of parallelization may be ensured even though the molded product has a problem in fluidity.

Further, after the second pressurizing process, it may be further detected that the pressure of the pressure sensor 87 becomes a set pressure, so that only the pressure control is performed as a third pressurizing process. If the compression hydraulic cylinder is controlled by means of just pressure control, the servo valve 86 is controlled so that the pressure of the compressing oil chamber 22a of each compression hydraulic cylinder reaches the target pressure, thereby allowing uniform pressurization. In other case, an individual target pressure may also be set to each compression hydraulic cylinder for control. Further, in both the second pressurizing process and the third pressurizing process, if a difference between values of the position sensors 20 exceeds a predetermined value, this may be considered as abnormality and the molding process may be intercepted. In addition, after the first pressurizing process using the position control, the second pressurizing process may be performed by using only the pressure control without using a factor of the position control (or the speed control). In this case, the control change is triggered in the same way as above.

In addition, if the lower mold 13 and the upper mold 12 have been already heated, the process is converted into a cooling process during the compressing process, which promotes cooling and solidifying the resin material M including a carbon fiber and molding a primary molded product M1 including a carbon fiber. In addition, when the vertical press machine 14 closes the mold, the mold is moved so that the lower mold 13 lifts up to be closed by the upper mold 12.

Figure 8:
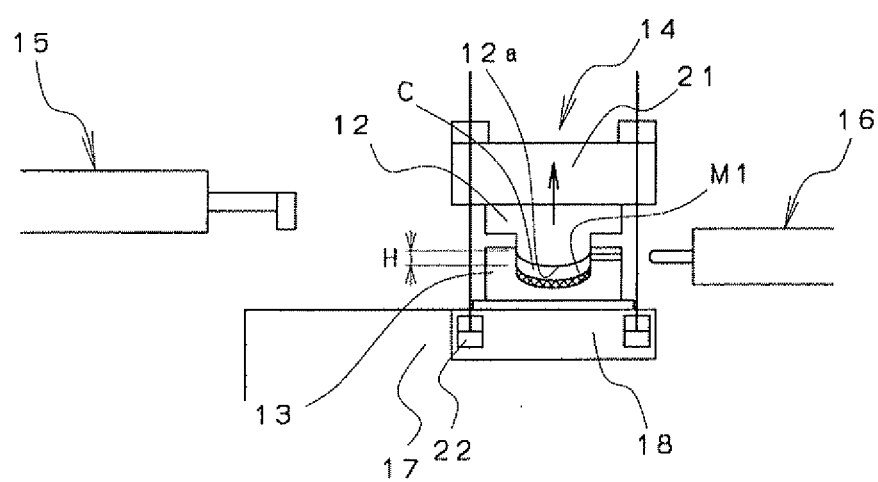
FIG. 8 is a diagram showing the compression molding method of a resin molded product including a fiber according to the embodiment, which illustrates a state in which a space is formed between a cavity surface and a compression-molded primary molded product after the compression molding.

Next, as shown in FIGS. 8 and 13, if a predetermined time passes, the compression hydraulic cylinder 22 of the press machine 14 is operated in a way of opening the mold, so that the upper mold 12 slightly lifts up without entirely opening from the lower mold 13. At this time, the compression hydraulic cylinder 22 is operated by the speed control (or the position control) to detect a value of each position sensor 20, and the compression hydraulic cylinders 22 are individually controlled. The control method is identical to the first pressurizing process, but the oil chamber for mainly supplying the working fluid is the mold-opening oil chamber 22b. At this time, the primary molded product P including a carbon fiber remains in the lower mold 13, and the primary molded product P is released from the cavity surface 12a of the upper mold 12 to form a cavity C (or a secondary cavity) with a height H. However, at this time, the releasing may be performed in a state that the primary molded product P is attached to the upper mold 12, so that a cavity C (or a secondary cavity) may be formed between the primary molded product P including a carbon fiber and the cavity surface 13a of the lower mold 13. In any way, the cavity surface 12a or 13a of the mold may be uniformly released from the primary molded product P including a carbon fiber, which is in a soft state, which allows the primary molded product P to be maintained in an agreeable state.

Figure 9:
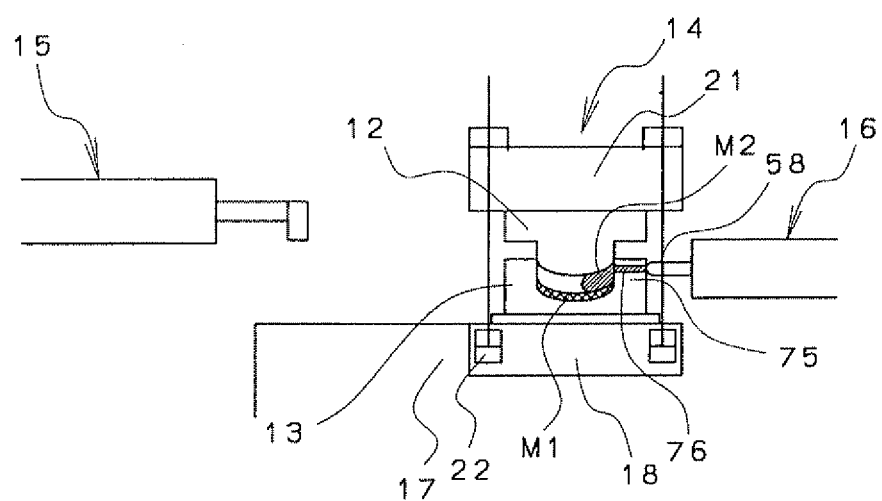
FIG. 9 is a diagram showing the compression molding method of a resin molded product including a fiber according to the embodiment, which illustrates a state in which an injection compression molding (injection) is initiated.

Next, as shown in FIGS. 9 and 13, the nozzle 58 of the injection machine 16 comes into contact with the nozzle touch surface 75 formed at a side surface of the lower mold 13 at the other side (the right side in FIG. 1). In addition, a gate valve of the hot runner 76 of the lower mold 13 is opened. Moreover, in the injection process of the injection machine 15, the screw, not shown, in the heating barrel 67 moves forward by means of the operation of the injection servo motor 71. By doing so, by means of the hot runner, the molten resin M2 starts being injected into the cavity C (the secondary cavity) formed between the primary molded product P of the lower mold 13 and the cavity surface 12a of the upper mold 12. In this embodiment, polycarbonate which has been used as a binder resin in the primary molding (the compression molding) together with a carbon fiber is also used in the secondary molding. However, the binder resin of the resin M1 including a carbon fiber, which has been used in the primary molding, may also be different from the resin M2 used in the secondary molding.

The shapes of the molds 12, 13 and the contact location of the nozzle 58 of the injection machine to the molds 16 are not limited to the above but may be modified in various ways. For example, the nozzle 58 may contact a parting surface of the molds, or the nozzle 58 may contact a side of any one of the fixed plate 18, the movable plate 21 and the upper mold 12. In addition, the molds 12, 13 may be inserting type molds in which the upper mold 12 is engaged with the lower mold 13 or surface-contact type molds in which the upper mold 12 surface-contacts the lower mold 13. In case of the surface-contact mold, sidewalls surrounding the cavity surface 13a of the lower mold 13 (or the upper mold 12) vertically move by means of springs, and surrounding components such as the cavity surface 12a of the upper mold 12 (or the lower mold 13) surface-contact the contacted surface of the sidewall.

Figure 10:
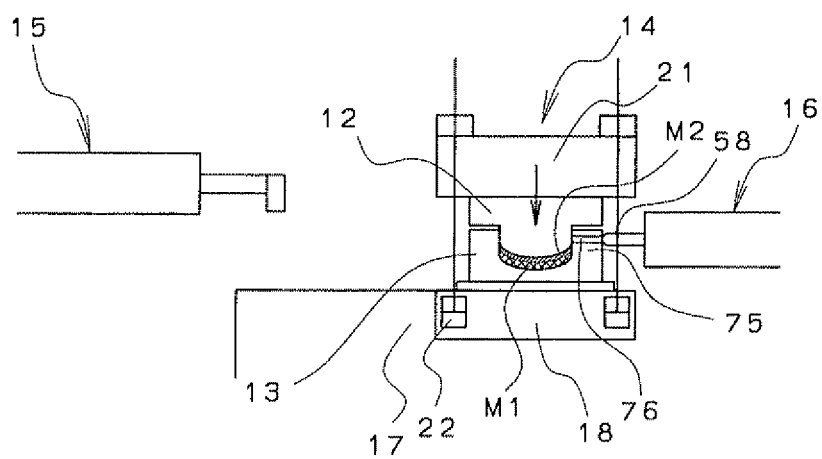
FIG. 10 is a diagram showing the compression molding method of a resin molded product including a fiber according to the embodiment, which illustrates a state of a compression process or cooling process after the injection in the injection compression molding.
Figure 11:
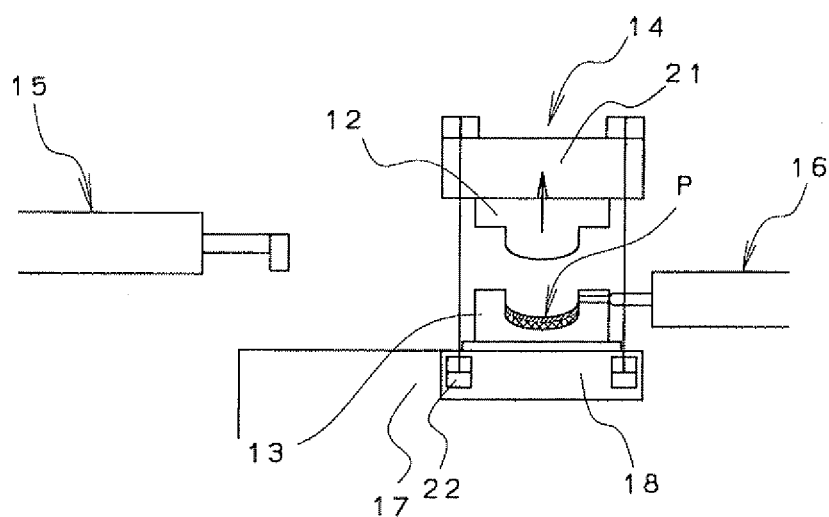
FIG. 11 is a diagram showing the compression molding method of a resin molded product including a fiber according to the embodiment, which illustrates a state in which the injection compression molding is completed and the mold is opened.

Next, as shown in FIG. 10, the compression hydraulic cylinder 22 of the press machine 14 initiates its operation, and regarding the timing for initiating operation, the compression molding (the injection compression molding) may be initiated by the compression hydraulic cylinder 22 after detecting a location of the screw simultaneously with injection or during the injection. In addition, the upper mold 12 moves downwards again by the operation of the compression hydraulic cylinder 22, thereby pressurizing and compressing the molten resin M2 injected into the cavity C (the secondary cavity). Since the injection is initiated after the cavity C (the secondary cavity) is broadened at an initial stage, the molten resin M2 may be easily injected in the cavity C. In addition, since the compression molding (the injection compression molding) is initiated by the press machine 14 from an intermediate stage, it is possible to promote the flow of the molten resin M2 to the end of the cavity C (the secondary cavity). Moreover, since the primary molded product M1 including a carbon fiber and the molten resin M2 are compressed, the surface of the primary molded product M1 including a carbon fiber may be agreeably adhered to the layer of the secondarily injected molten resin M2.

Since the cavity C (the secondary cavity) is still open during the overall injection compression molding process as shown in FIG. 13, the compression hydraulic cylinder 22 performs position control (speed control), namely the first pressurizing process. During the overall injection compression molding, due to the injection pressure of the injection machine 16, the upper mold 12 serving as a movable mold may often receive a biased force and lose the degree of parallelization with respect the lower mold 13 serving as a fixed mold. However, since each compression hydraulic cylinder 22 is controlled by means of the position control (or the speed control) to perform parallelization control to the movable plate 21 with respect to the fixed plate 18, it is possible to form a layer of the resin M2 in a uniform thickness with respect to the primary molded product M1. In addition, if the cavity C (the secondary cavity) is filled with the molten resin M2, in this embodiment, as a next second pressurizing process, the compression molding is performed by using the position control (or the speed control) and the pressure control together. Moreover, at a final stage, a component shrunken by cooling is pressurized by only the pressure control. However, the parallelization control using only the position control (or the speed control) may be directly shifted to a control using only the pressure control, identical to the compression molding of the resin molded product including a fiber.

Moreover, the molds 12, 13 in a heated state may be cooled from an intermediate time of the compression molding (the injection compression molding), thereby promoting cooling and solidification of the resin material M including a fiber in a molten state. In other case, if the mold has no heating function, the mold is cooled intactly. Therefore, in this embodiment, in a state in which the lower mold 13 and the upper mold 12 are not entirely opened, the compression molding, the cavity formation and the injection compression molding are performed successively. In addition, in all the processes, the parallelization control is performed by means of the position control or the speed control using feedback control of each hydraulic cylinder 22.

As shown in FIG. 12, if a predetermined time passes, each compression hydraulic cylinder 22 of the press machine 14 operates for releasing. At this time, the parallelization control is formed by means of the position control (the speed control) using feedback control, identical to the case in which the cavity is formed after the compression molding. By doing so, the upper mold 12 is opened from the lower mold 13 while maintaining a parallel state, so that the layer of the resin M2 of the composite molded product P including a carbon fiber may also be released agreeably. And then, the servo motor 23 of the mold opening and closing mechanism is operated to move the upper mold 12 upwards from the lower mold 13, so that the composite molded product P including a carbon fiber remaining in the lower mold 13 may be taken out.

Next, as shown in FIGS. 2 and 12, by the operation of the servo motor 28 of the moving device 17, the lower mold 13 having the cavity surface 13a on which the composite molded product P including a carbon fiber is maintained moves from the pressurization position a2 to the material supply position a2 (or the unloading position). In addition, the driving source 63 of the ejector device 61 is operated so that the protruding pin 62 protrudes through the ejector rod and the ejector plate, and the composite molded product P including a carbon fiber is pulled from the cavity surface 13a. Substantially at the same time, the sucking disk 65 of the unloading unit 64 is absorbed to the upper surface of the composite molded product P including a carbon fiber, thereby maintaining the composite molded product P including a carbon fiber and carrying the same to another process. In addition, at this time, even though the composite molded product P including a carbon fiber has a small protrusion mark, no problem occurs in use since the primary molded product M1 including a carbon fiber which becomes a back surface is pulled by the protruding pin 62.

INDUSTRIAL APPLICABILITY

The present disclosure is not limited to the above embodiment, and a person having ordinary skill in the art may modify the embodiment based on the intent of the present disclosure, though not listed one by one. In this embodiment, it has been described that a resin material M including a carbon fiber in a molten state is supplied from the material supply device 15 serving as a material heating mechanism, and then, after compression molding is performed by the press machine 14, injection compression molding is successively performed to form a composite molded product P including a carbon fiber. However, the present disclosure is directed to molding a molded product P including a carbon fiber while maintaining the degree of parallelization between the molds 12, 13 by using a plurality of compression hydraulic cylinders 22, and it is also possible that the molding process is completed by performing only compression molding to the resin material M including a carbon fiber. When the resin material M including a carbon fiber in a molten state is compression-molded to the press machine 14 by means of parallelization control, the kind of the molded product is not specially limited, but a cover panel of a vehicle (including a door) may be considered.

In addition, for example, the present disclosure may supply a prepreg sheet (CFRP) (made of a thermosetting resin or a thermoplastic resin) in a solid or half-molten state, composed of a resin such as epoxy, including a carbon fiber to the lower mold 13 by using a supply device such as a separate gripping and carrying robot. In these cases, the prepreg sheet may be preheated by using an IR heating device serving as the material heating mechanism, not shown, above the lower mold 13 and be melted to a molten state which may be molded by the press machine 14. In addition, when the press machine 14 performs compression molding to the prepreg sheet in a half-molten state or in a molten state, in the first pressurizing process, it is required to move the upper mold 12 while maintaining the degree of parallelization of the upper mold 12 serving as a movable mold with respect to the lower mold 13 serving as a fixed mold. Therefore, in a compression molding apparatus and compression molding method of a resin molded product including a carbon fiber, which performs compression molding by supplying a prepreg sheet, a plurality of (at least three) position sensors 20 and a plurality of (at least three) compression hydraulic cylinders 22 are installed, and it is important that the compression hydraulic cylinder 22 performs the compression molding by using the press machines 14 individually controlled according to the information of the position sensors 20, in order to mold a preferable molded product P including a fiber. Further, regarding the resin material M including a carbon fiber, a carbon fiber and a resin material may be separately supplied onto the lower mold. In detail, at least one carbon fiber mat and at least one resin plate, piled up each other, may be supplied onto the lower mold. In addition, regarding the resin material M including a carbon fiber, a carbon fiber and a molten resin may be separately supplied onto the lower mold.

Moreover, the present disclosure may directly supply a resin material M including a fiber in a molten state from the material supply device 15 onto the lower mold 13 fixed to the press machine 14. In this case, if the resin material M including a fiber in a molten state is completely supplied onto the lower mold 13, the material supply device 15 moves out of the press machine 14 and the resin material M including a fiber in a molten state is instantly pressurized by the press machine 14. At this time, the pressurizing process may be performed by means of parallelization control. Further, the present disclosure may directly supply a prepreg sheet serving as a resin material M including a fiber onto the lower mold 13 fixed to the press machine 14 from a supply device such as a separate gripping and carrying robot. In this case, the resin material M including a fiber is in a sufficient molten state by means of the material heating mechanism until the compression molding is initiated.

The invention claimed is:

1. A compression molding apparatus of a resin molded product including a fiber, which supplies a resin material including a fiber to an open lower mold by a material supply device, then closes the lower mold and an upper mold, and compresses the material, the compression molding apparatus comprising:
   a moving device configured to transfer the lower mold between a supply position out of a press machine and a pressurization position in the press machine in which the lower mold is open;
   a material supply device, provided with a material heating mechanism configured to melt the resin material with the fiber into a molten state, and configured to supply the resin material with the fiber onto the lower mold positioned at the supply position out of the press machine;
   an upper plate to which the upper mold is attached and a lower plate to which the lower mold configured to transfer between the supply position and the pressurization position is attached;
   at least three position sensors for detecting a distance between the upper mold and the lower mold or the upper plate and the lower plate;
   a pressure sensor configured to detect a pressure of a working fluid; and
   at least three compression hydraulic cylinders installed to any one of the upper plate and the lower plate and individually controlled according to information of the position sensors and the pressure sensor, wherein compression molding is performed after the lower mold is transferred to the pressurization position, in which the lower mold is placed beneath the upper mold of the press machine, and comprises:

1) a first pressurization process that individually conducts either a position control or a speed control to each of the compression hydraulic cylinders based on information of the position sensors, and 2) a second pressurization process that either individually controls the compression hydraulic cylinders based on only information of the pressure sensor, or individually controls the compression hydraulic cylinders based on information of the position sensors and the pressure sensor.

2. A compression molding apparatus of a resin molded product including a fiber, which supplies either a prepreg sheet of a resin material with a carbon fiber or a laminated material including a carbon fiber mat and a resin plate to an open lower mold by a material supply device, then closes the lower mold and an upper mold, and compresses the material, the compression molding apparatus comprising:

a moving device configured to transfer the lower mold between a supply position out of a press machine and a pressurization position in the press machine in which the lower mold is open;

a material supply device configured to supply either the prepreg sheet of the resin material with the carbon fiber or the laminated material including the carbon fiber mat and the resin plate onto the lower mold positioned at the supply position out of the press machine;

a material heating mechanism for melting the resin material including a fiber into a molten state or a half-molten state until compression molding is initiated;

an upper plate to which the upper mold is attached and a lower plate to which the lower mold configured to transfer between the supply position and the pressurization position is attached;

at least three position sensors for detecting a distance between the upper mold and the lower mold or the upper plate and the lower plate;

a pressure sensor configured to detect a pressure of a working fluid; and at least three compression hydraulic cylinders installed to any one of the upper plate and the lower plate and individually controlled according to information of the position sensors and the pressure sensor, wherein compression molding is performed after the lower mold is transferred to the pressurization position, in which the lower mold is placed beneath the upper mold of the press machine, and comprises:

1) a first pressurization process that individually conducts either a position control or a speed control to each of the compression hydraulic cylinders based on information of the position sensors, and 2) a second pressurization process that either individually controls the compression hydraulic cylinders based on only information of the pressure sensor, or individually controls the compression hydraulic cylinders based on information of the position sensors and the pressure sensor.

3. The compression molding apparatus of a resin molded product including a fiber according to claim 1, wherein the material supply device is configured to include both a plasticizing function and an injection function, or allowed to be configured by an extruding material supply device for extruding molten material by rotating just a screw, and the material supply device is provided with a die having a heating barrel with a heater and a die with a supply hole.

4. The compression molding apparatus of a resin molded product including a fiber according to claim 2, wherein the resin material including the fiber is the prepreg sheet, and preheat is applied to the prepreg sheet supplied on the lower mold.

* * * * *